Figure 1:
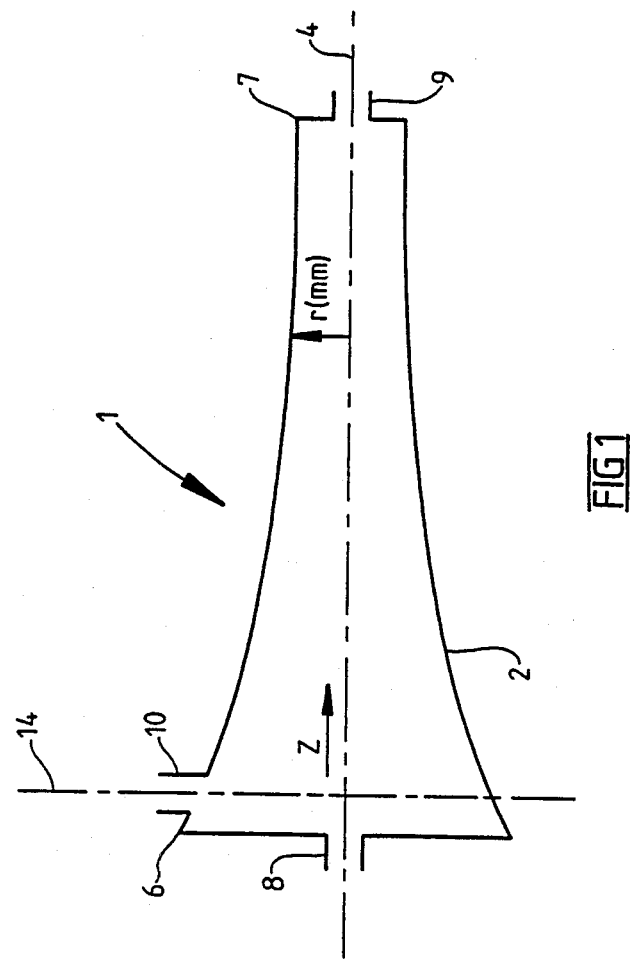

United States Patent [19]

Thew et al.

[11] Patent Number: 4,849,107

[45] Date of Patent: Jul. 18, 1989

[54] CYCLONE SEPARATOR

[76] Inventors: Martin T. Thew, 7 Court Close, Bitterne, South Hampton, Hampshire; Derek A. Colman, 21 Knoll Road, Fleet, Hampshire, both of England

[21] Appl. No.: 86,084

[22] PCT Filed: Oct. 21, 1986

[86] PCT No.: PCT/AU86/00313

§ 371 Date: Jul. 28, 1987

§ 102(e) Date: Jul. 28, 1987

[87] PCT Pub. No.: WO87/02275

PCT Pub. Date: Apr. 23, 1987

[30] Foreign Application Priority Data

Oct. 21, 1985 [AU] Australia .................. PH2990/85

[51] Int. Cl.[4] .......................................... B01D 17/038
[52] U.S. Cl. .............................. 210/512.1; 209/144; 209/211
[58] Field of Search ............... 210/512.1; 209/211, 209/144

[56] References Cited

U.S. PATENT DOCUMENTS 4,394,138  7/1983  Schilling .................. 210/512.1

Primary Examiner—Frank Sever
Attorney, Agent, or Firm—Ladas & Parry

[57] ABSTRACT

The instant invention provides a cyclone separator having a chamber profile designed to preclude shear planes and stagnation flows therewithin.

9 Claims, 1 Drawing Sheet

ı

CYCLONE SEPARATOR

This invention relates generally to cyclone separators for separating multi-phase mixtures such as, for example, oil/water mixtures.

Early work in connection with cyclone separators of this type is described in U.S. Pat. No. 4,237,007 where certain dimensional relationships between various portions of a cyclone separator are described. The present applicant has also conducted extensive investigations in this area and reference should be made to applicant's many co-pending applications.

Initial investigations in this area indicated that for good separation efficiency in cyclone separators and, in particular, to those suited for fluid/fluid applications, it was necessary to define a cyclone separator in the terms given in the aforementioned U.S. Patent and as described in applicant's many co-pending applications.

Significant research has since been carried out and it has now been found that the criteria important to cyclone separator design in particular relating to mixtures such as oil/water mixtures are the three dimensional shear planes and stagnation flows.

Thus, it is an object of the present invention to provide a cyclone separator which is arranged so to minimize or avoid high shear planes and stagnation flows.

Basically, it has been found that this can be achieved by the use of gradual changes of section which leads to improved phase separation and reduced energy consumption.

According to one aspect of the present invention there is provided a cyclone separator comprising elements, designed, sized and arranged for treating a mixture of fluids (in particular but not exclusively multi-phase liquids such as oil/water) for separating a more dense component from a less dense component thereof, the separator comprising:

(a) an elongated separating chamber having a longitudinal axis of symmetry between opposite first and second ends, the separating chamber being of greater cross-sectional dimension at the first end than at the second end, the separating chamber having an overflow outlet and at least one underflow outlet; and (b) at least one feed inlet which is preferably tangentially directed and which is proximate to the first end and disposed in a plane containing a secondary axis which extends from the longitudinal axis in a direction normal thereto, characterized in that the profile of said separating chamber is at least in part of generally exponential form.

According to another aspect of the present invention there is provided a cyclone separator comprising elements, designed, sized and arranged for treating a mixture of fluids (in particular but not exclusively multi-phase liquids such as oil/water) for separating a more dense component from a less dense component thereof, the separating comprising:

(a) an elongated separating chamber having a longitudinal axis of symmetry between opposite first and second ends, the separating chamber being of greater cross-sectional dimension at the first end than at the second end, the separating chamber having an overflow outlet and at least one underflow outlet; and (b) at least one feed inlet which is preferably tangentially directed and which is proximate to the first end and disposed in a plane containing a secondary axis which extends from the longitudinal axis in a direction normal thereto, characterized in that the profile of said separating chamber is at least in part of generally cubic form.

In one preferred form, the profile meets the following requirement:

$$r(mm) = 6 + 22e^{-z^{\frac{1}{2}}/20}$$

where r = radius of the separating chamber
z = a measurement taken from a point in the plane of or spaced downstream of the point in a direction downstream thereof.

In another preferred form, the profile meets the following requirement:

$$r(mm) = 28 - [z(2z^2 \times 10^{-6} + 5)]^{\frac{1}{3}}$$

Preferably, the overflow outlet is at the first end and the underflow outlet is at the second end.

The separating chamber may include a swirl chamber section at the upstream end thereof the swirl chamber section being in one form substantially cylindrical in cross-section.

An embodiment will be hereinafter described by way of example with reference to the drawing in which:

FIG. 1 is a schematic side elevation showing the general form of the cyclone separator of the invention.

FIG. 1 shows the basic components of a cyclone separator and includes an elongated separating chamber 2 having a longitudinal axis of symmetry 4 between opposite first and second ends 6 and 7. The separating chamber 2 is of greater cross-sectional dimension at the first end than at the second end, and has an overflow outlet 8 at the first end and at least one underflow outlet 9 at the second end.

At least one preferably tangentially directed feed inlet 10 is arranged proximate to the first end 6 and disposed in a plane containing a secondary axis 4 which extends from the longitudinal axis in a direction normal thereto.

A distinct swirl chamber section which may be cylindrical in cross section may be provided at the first end of the separating chamber.

According to the invention, the profile of the separating chamber is either generally cubic or exponential in form.

EXAMPLES

Testing was carried out on two different types of cyclone separators of differing profiles. The profile of one was of generally exponential form meeting the following requirement:

$$r(mm) = 6 + 22e^{(-z^{\frac{1}{2}}/20)}$$

z in this case and the following case is a measurement taken from a point 15 mm downstream of the plane of the inlet.

The profile of the other was of generally cubic form meeting the following requirement:

$$r(mm) = 28 - [z(2z^2 \times 10^{-6} + 5)]^{\frac{1}{3}}$$

The flow rate Qi at the inlet for both cases was 100 l/min. The diameter of the separator at the inlet was 38 mm. The temperature of the mixture was between 17.5° to 20° C. The mixture was forties crude oil in fresh water. An involute type entry was used and two sizes of inlet droplet tested, they bring one of 35 μm and the other 51 μm. The results are set out in the following table:

| Geometry of Taper | Inlet Geometry | ε (efficiency) $d_i = 35\ \mu m$ | ε (efficiency) $d_i = 51\ \mu m$ |
|---|---|---|---|
| Exponential | I | .906 | .976 |
| Cubic | I | .883 | .963 |

We claim:

1. A cyclone separator comprising elements, designed, sized and arranged for use in the separation of multi-phase liquids such as oil/water for separating a more dense component from a less dense component thereof, the separator comprising:
   (a) an elongated separating chamber having a longitudinal axis of symmetry between opposite first and second ends, the separating chamber being of greater cross-sectional dimension at the first end than at the second end, the separating chamber having an overflow outlet and at least one underflow outlet; and
   (b) at least one tangentially directed feed inlet proximate to the first end and disposed in a plane containing a secondary axis which extends from the longitudinal axis in a direction normal thereto and means for precluding shear planes and stagnation flows including a profile of said separating chamber which is at least in part of generally exponential form.

2. A cyclone separator comprising elements, designed, sized and arranged for use in the separation of multi-phase liquids such as oil/water for separating a more dense component from a less dense component thereof, the separator comprising:
   (a) an elongated separating chamber having a longitudinal axis of symmetry between opposite first and second ends, the separating chamber being of greater cross-section dimension at the first end than at the second end, the separating chamber having an overflow outlet and at least one underflow outlet; and
   (b) at least one tangentially directed feed inlet proximate to the first end and disposed in a plane containing a secondary axis which extends from the longitudinal axis in a direction normal thereto, and means for precluding shear planes and stagnation flows including a profile of said separating chamber which is at least in part of generally cubic form.

3. A cyclone separator according to claim 1 characterized in that said profile meets the following requirement:

$$r(mm) = 6 + 22e^{(-z^{\frac{1}{2}}/20)}$$

where r = radius of the separating chamber
z = a measurement taken from a point in the plane of or spaced downstream of the point in a direction downstream thereof.

4. A cyclone separator according to claim 2 characterized in that said profile meets the following requirement:

$$r(mm) = 28 - [z(2z^2 \times 10^{-6} + 5)]^{\frac{1}{3}}$$

5. A cyclone separator according to claim 1, characterized in that said overflow outlet is at said first end and said underflow outlet is at said second end.

6. A cyclone separator according to claim 1 characterized by said separating chamber including a swirl chamber section at the upstream end thereof.

7. A cyclone separator according to claim 6 characterized in that said swirl chamber section is substantially cylindrical in cross-section.

8. A cyclone separator according to claim 2, characterized in that said overflow outlet is at said first end and said underflow outlet is at said second end.

9. A cyclone separator according to claim 2, characterized by said separating chamber including a swirl chamber section at the upstream end thereof.

* * * * *